Feb. 20, 1923.  
A. E. PARNACOTT  
1,446,431  
STEERING ARRANGEMENT FOR MOTOR AND OTHER ROAD VEHICLES  
Filed Sept. 19, 1922  2 sheets-sheet 1
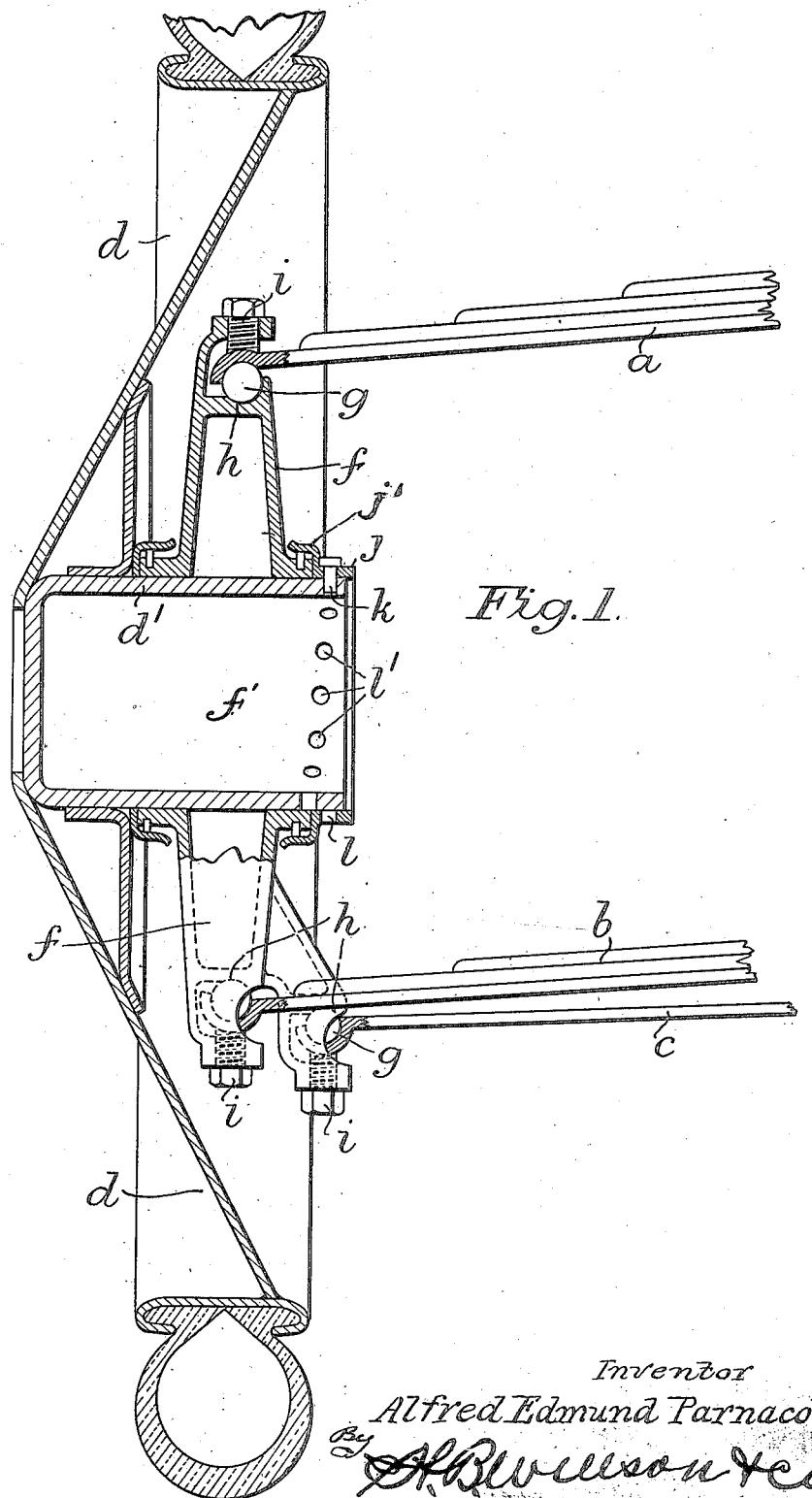
Inventor  
Alfred Edmund Parnacott  
Attorneys

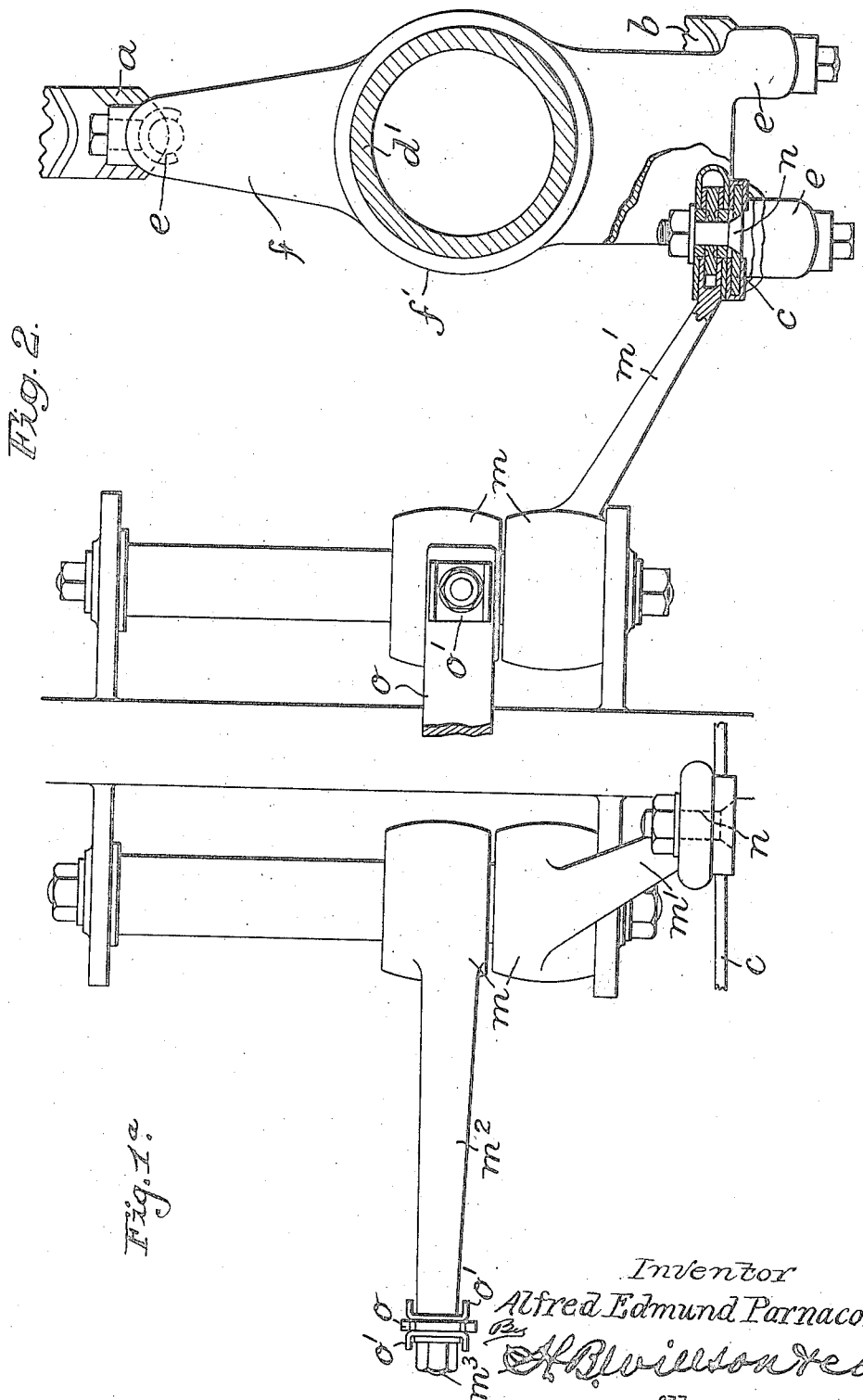

Patented Feb. 20, 1923.

1,446,431

UNITED STATES PATENT OFFICE.

ALFRED EDMUND PARNACOTT, OF LONDON, ENGLAND.

STEERING ARRANGEMENT FOR MOTOR AND OTHER ROAD VEHICLES.

Application filed September 19, 1922. Serial No. 589,247.

*To all whom it may concern:*

Be it known that ALFRED EDMUND PARNACOTT, of Penge Lane, Penge, London, S. E. 20, England, a subject of the King of Great Britain and Ireland (whose post-office address is Penge Lane, Penge, London, S. E. 20, England), has invented certain new and useful Improvements in or Relating to Steering Arrangements for Motor and Other Road Vehicles, of which the following is a specification.

This invention for improvements in or relating to the steering arrangements of motor and other road vehicles relates to steering axles comprising superposed leaf springs connected at their ends to steerable road wheels and supporting the weight of the vehicle at some point or points intermediate of their ends and to the means employed for effecting the steering control of the wheels.

The object of the present invention is to provide an improved and simplified construction of steering carriage and steering gear which shall afford greater flexibility and be more reliable than those hitherto employed and furthermore shall prevent deflection of the steering by irregular road surfaces, as well as the adverse effects on the steering of reaction of the brake or drive torque.

According to the present invention the steering axle comprises upper and lower load carrying springs and a third spring of similar camber serving as a steering coupling or track rod and the steering road wheels are pivotally connected to the ends of the springs in such manner that the steering movement sets up a canting action on the road wheels tending to minimize the destructive axial thrusts imposed upon the wheels used with steering axles of ordinary construction. The ends of the springs are connected by universal joints to link members hereinafter referred to as spiders, which are formed with bearings adapted to receive journals attached to the road wheels and the canting action mentioned above is brought about by locating the universal connection with the upper load carrying spring at a point above the wheel center and the universal connection with the other two springs at points slightly forward and rearward of the vertical line of the wheel center, the respective positions of the last two points of connection being dependent upon whether a front or rear steering axle is to be constructed. Dished wheels are preferably employed and the points of connection between the spider and the spring ends are arranged as nearly as possible in the central plane of rotation of the wheel tire.

The invention is hereinafter more fully described with reference to the accompanying drawing in which:—

Fig. 1 is a front elevation partly in section of a portion of my improved steering system.

Fig. 1ᵃ is a side elevation of the parts shown in Fig. 2.

Fig. 2 is an end elevation of the same with the road wheel removed.

In the example illustrated, the axle comprises three leaf springs $a$, $b$ and $c$ of similar camber arranged transversely of the vehicle, two of these springs $a$ and $b$ constituting load bearing members proper being attached at or near their center to the vehicle frame whilst the third spring $c$ forms a steering track rod or coupling rod. One of the load bearing springs $a$ is positioned vertically above the common axis of the road wheels $d$ when in their normal position, whilst the other load carrying spring $b$ is arranged below and slightly forward of said axis and these springs are connected at their ends by universal joints $e$ to spiders $f$ carrying the bearings in which the road wheel journals rotate, the effect being that the spiders are pivoted on axes with a slight rearward inclination from the vertical. The third spring $c$ serving as coupling rod is similarly connected by universal joints $e$ to the spiders but is positioned rearwardly of the common axis of the road wheels $d$.

By this arrangement it will be evident that the rearward coupling spring $c$ will not only effect the steering control but the wheels $d$ when turning will be inclined from the vertical in the same manner as those of a bicycle and the deleterious stresses imposed upon the wheel structure considerably reduced.

Each of the spiders $f$ forming the point of connection between the spring axle and road wheels preferably comprises a central collar or hollow boss $f'$ adapted to receive or form a bearing for the journal $d'$ of the wheel from which collar one arm formed with a recess or socket at its extremity extends upwardly whilst a second arm depends and is formed with a forked extremity having two recesses or sockets. Each of these recesses is adapted to receive the end of one of the springs together with a steel bearing ball $g$ which beds between a hollow spherical seating $h$ formed in the recess and a cup like depression in the spring end, whilst an adjustable screw plug $i$ also having a hollow spherical seating is provided to screw into an aperture in the spider and press upon the outer surface of the cup and so hold the spring and the ball $g$ in engagement with the first mentioned seating. All the spring ends are engaged with the spiders in the manner just described the connections constituting universal joints which permit of free angular movement between the parts when the wheel or vehicle body is oscillated vertically. It will be understood however that other forms of universal couplings may be employed for connecting the spiders to the springs.

As mentioned above the spiders are formed with a central collar or hollow boss $f'$ which serves as a bearing for the hollow journal $d'$ attached to and projecting inwardly from the conical or dished sheet-metal wheel $d$. The journal is preferably retained in this bearing by an adjustable thrust ring $j$ which engages the inner end of the journal and has a dust excluding flange $j'$ arranged to overlap externally the inner end of the spider bearing $f'$. The thrust ring $j$ is made a sliding fit upon the journal end and is adapted to be locked in any position of adjustment by a locking bolt $k$ passed through aligned holes in the ring and the journal. To provide for a suitable range of adjustment the thrust ring $j$ may be formed with a plurality of holes $l$ spaced equidistantly around its periphery whilst a corresponding number of holes $l'$ are arranged in helical form around the journal $d'$ in such manner that in any position of adjustment one hole in the ring comes into or substantially into alignment with a hole in the journal.

Steering control of the axle is effected by a bell crank lever $m$ pivoted on the vehicle frame and having one arm $m'$ engaging a bolt or pin $n$ attached to the coupling member $c$ of the axle. In order to obviate the use of a universal joint at the extremity of the other arm $m^2$ of the bell crank lever which is coupled to the steering connecting or pull and push rod, the arm $m^2$ of the lever is preferably made as long as practicable so that a small degree of angular movement only is necessary and the end of the arm $m^2$ is formed with a screwed shank $m^3$ upon which a blade of spring steel $o$ constituting the end of the connecting rod is held between washers $o'$ by a nut engaging the screwed shank.

As stated hereinbefore the steering arrangement described is equally applicable to front and rear axles and where it is required to drive the road wheels power may be transmitted by drive shafts projecting into the hollow journals of the wheels and operatively connected thereto by universal joints located approximately in the central planes of rotation of the wheels.

By means of the construction described the cost of manufacture is not only considerably reduced but an arrangement of steering carriage and gear is provided which is improved in point of flexibility, strength and weight.

I claim:—

1. A structure of the character described comprising upper and lower load carrying springs positioned out of vertical alinement, a steering rod spaced transversely from the lower spring whereby a vertical line passing through the upper spring will pass between the lower spring and steering rod, and a wheel mounting having its upper portion connected with the end of the upper spring and its lower portion connected with the lower spring and steering rod.

2. A structure of the character described comprising upper and lower load carrying springs positioned out of vertical alinement, a steering rod spaced transversely from the lower spring whereby a vertical line passing through the upper spring will pass between the lower spring and steering rod, and a wheel mounting spider having a bearing, an upper arm connected with said upper spring, and lower arms connected with the lower spring and steering rod.

3. The structure of claim 1 having the wheel mounting formed with a hollow boss serving as a bearing for a wheel, upwardly and downwardly extending arms each provided with a recess, and ball and socket joint structures fitting into the recesses and connecting the springs and steering rod with said wheel mounting.

4. The structure of claim 1 having the wheel mounting formed with a hollow boss serving as a bearing for a wheel, upwardly and downwardly extending arms each provided with a recess, the steering rod and the spring having their ends formed into cups extending into the recess of said arms, balls in said recesses extending into said cups, and set screws extending into said recess and engaging said cups to hold the cups in engagement with said balls and the balls in the recesses.

In testimony whereof he has affixed his signature, in presence of two witnesses.

ALFRED EDMUND PARNACOTT.

Witnesses:
CHAS. J. FALCONER,
L. A. GARRETT.